US012437121B2

United States Patent
Waterman et al.

(10) Patent No.: US 12,437,121 B2
(45) Date of Patent: Oct. 7, 2025

(54) EFFICIENT PROCESSING OF MASKED MEMORY ACCESSES

(71) Applicant: SiFive, Inc., San Mateo, CA (US)

(72) Inventors: Andrew Waterman, Berkeley, CA (US); Krste Asanovic, Oakland, CA (US)

(73) Assignee: SiFive, Inc., Santa Clara, CA (US)

( * ) Notice: Subject to any disclaimer, the term of this patent is extended or adjusted under 35 U.S.C. 154(b) by 268 days.

(21) Appl. No.: 18/023,948

(22) PCT Filed: Sep. 1, 2021

(86) PCT No.: PCT/US2021/048599
§ 371 (c)(1),
(2) Date: Feb. 28, 2023

(87) PCT Pub. No.: WO2022/051325
PCT Pub. Date: Mar. 10, 2022

(65) Prior Publication Data
US 2024/0012948 A1    Jan. 11, 2024

Related U.S. Application Data

(60) Provisional application No. 63/073,912, filed on Sep. 2, 2020.

(51) Int. Cl.
*G06F 21/78* (2013.01)
*G06F 9/30* (2018.01)

(52) U.S. Cl.
CPC .......... *G06F 21/78* (2013.01); *G06F 9/30036* (2013.01); *G06F 9/30038* (2023.08);
(Continued)

(58) Field of Classification Search
USPC .......................................................... 726/1
See application file for complete search history.

(56) References Cited

U.S. PATENT DOCUMENTS

| 5,657,475 A | 8/1997 | Gillespie et al. |
| 2010/0325483 A1 | 12/2010 | Gonion et al. |

(Continued)

FOREIGN PATENT DOCUMENTS

| CN | 107250996 A | 10/2017 | |
| CN | 104049943 B | * 7/2018 | ......... G06F 9/30036 |

(Continued)

OTHER PUBLICATIONS

International search report for international application No. PCT/US2021/048599; Mailed Jan. 3, 2022, 19 pages.

(Continued)

*Primary Examiner* — Sakinah White Taylor
(74) *Attorney, Agent, or Firm* — Kilpatrick Townsend & Stockton LLP

(57) ABSTRACT

Disclosed herein are systems and methods for processing masked memory accesses including handling fault exceptions and checking memory attributes of memory region(s) to be accessed. Implementations perform a two-level memory protection violation scheme for masked vector memory instructions. The first level memory check ignores mask information associated with a masked vector memory instruction and operates on a memory footprint associated with the masked vector memory instruction. If a memory protection violation is detected or speculative access is denied with respect to the memory footprint, a second level memory check evaluates mask information at a vector element level to determine whether a fault exception should be raised. If a mask bit for a vector element is set and a memory violation is detected, then a fault exception is raised for the masked vector memory instruction. If a mask bit is not set, execution of the masked vector memory instruction can continue.

20 Claims, 5 Drawing Sheets

(52) U.S. Cl.
CPC ............... *G06F 2212/1041* (2013.01); *G06F 2212/1052* (2013.01)

(56) References Cited

U.S. PATENT DOCUMENTS

| | | | |
|---|---|---|---|
| 2012/0060016 A1 * | 3/2012 | Eichenberger | G06F 9/30018 712/4 |
| 2015/0026444 A1 | 1/2015 | Anderson et al. | |
| 2015/0356294 A1 * | 12/2015 | Tan | G06F 9/30054 726/22 |
| 2016/0188242 A1 | 6/2016 | Gschwind et al. | |
| 2020/0160809 A1 | 5/2020 | Meixner et al. | |
| 2021/0382739 A1 * | 12/2021 | Guo | G06F 9/545 |
| 2025/0173277 A1 * | 5/2025 | Waterman | G06F 12/1458 |

FOREIGN PATENT DOCUMENTS

| | | | | |
|---|---|---|---|---|
| EP | 0211617 A2 * | 7/1986 | | G06F 9/3885 |
| EP | 3588360 B1 * | 11/2021 | | G06F 12/023 |
| JP | H0619709 A * | 1/1994 | | |
| KR | 20020087928 A * | 11/2002 | | G06F 9/3009 |
| TW | I494759 B | 8/2015 | | |
| TW | I690896 B * | 4/2020 | | G06V 10/955 |
| WO | WO-2022051325 A1 * | 3/2022 | | G06F 9/30036 |

OTHER PUBLICATIONS

Office Action for Application No. TW110132530, Mailed On May 12, 2025, 17 pages.

\* cited by examiner

EFFICIENT PROCESSING OF MASKED MEMORY ACCESSES

CROSS-REFERENCE TO RELATED APPLICATIONS

This application is a 371 of International Application No. PCT/US2021/048599, filed on Sep. 1, 2021, which claims priority to U.S. Provisional Application No. 63/073,912, filed on Sep. 2, 2020, the entire contents of which are hereby incorporated by reference.

TECHNICAL FIELD

This disclosure relates to execution of instructions in a processor, and namely, processing of masked memory accesses.

BACKGROUND

Processor cores can include scalar and vector processing units or machines to efficiently process scalar and vector instructions, respectively, in support of a wide range of implementation and use cases such as the Internet of Things (IoT), edge processing, and data center processing. These processor cores can execute instructions in-order or out-of-order.

Vector processing units can take several cycles to execute vector memory instructions such as vector loads or vectors stores. Consequently, both in-order and out-of-order processor cores and vector processing units permit processing of multiple vector instructions in a processing pipeline. That is, a following vector instruction can begin processing prior to a current vector instruction completes processing. This can occur even when the vector instructions are both vector memory instructions requiring memory access and subject to fault exceptions.

Some vector memory instructions are masked vector memory instructions. Masked vector memory instructions such as masked vector loads and/or masked vector stores can be complex operations requiring numerous clock cycles for execution. A mask can be used to mask elements of an N-element vector memory instruction that do not need to be or should not be executed.

Execution of memory instructions can be complex given fault exceptions and masked vectors. Current techniques fail to provide efficient processing of masked vector memory instructions which include handling of fault exceptions and checking memory attributes of memory region(s) to be accessed.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
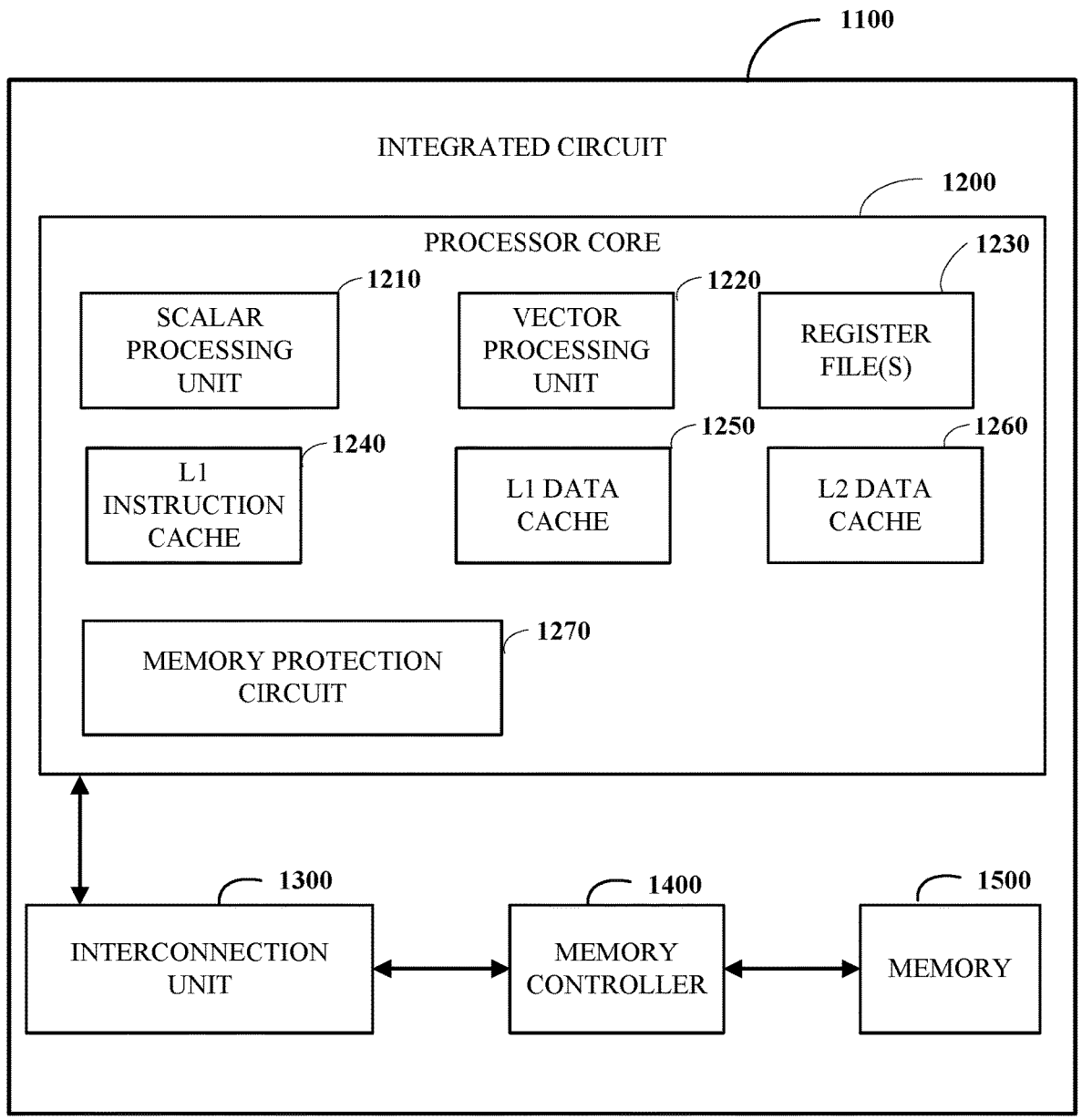
FIG. 1 is a block diagram of an example of an integrated circuit for executing instructions for efficient processing of masked vector memory accesses in accordance with embodiments of this disclosure.

Disclosed herein are systems and methods for efficient processing of masked memory accesses which include handling of fault exceptions and checking memory attributes of memory region(s) to be accessed.

Implementations described herein can be used to increase throughput and efficiency by performing a two-level memory protection violation scheme for masked vector memory instructions. The first level or conservative memory check ignores mask information associated with a masked vector memory instruction and operates on a memory footprint associated with the masked vector memory instruction. If a memory protection violation is not detected with respect to the memory footprint and memory attributes within the memory footprint indicate idempotency, execution of the masked vector memory instruction can continue. This results in optimized execution of masked vector memory instructions. If a memory protection violation is detected with respect to the memory footprint or speculative access is not permitted, a second level or exact memory check evaluates information at a vector element level to determine whether a fault exception should be raised. That is, the vector elements are processed individually and sequentially. If a mask bit for a vector element is set and a memory protection violation is detected for that vector element, then a fault exception is raised for the masked vector memory instruction. If a mask bit for a vector element is set and no memory protection violation is detected for that vector element, the corresponding memory access is performed, and execution can continue. If a mask bit is not set, the memory access is not performed, and execution of the masked vector memory instruction can continue. The two-level memory protection violation scheme can improve throughout and efficiency by analyzing information only when a potential memory protection violation is detected as opposed to checking the mask information for each masked vector memory instruction.

Implementations described herein can check idempotency memory attributes of memory footprints associated with the masked vector memory instructions. Idempotency memory attributes can indicate whether speculative access is permitted for a memory footprint or memory region(s). That is, whether read and write accesses to the memory footprint or memory region(s) have side effects. For example, whether the access is to cacheable memory versus access to an input/output (I/O) device. If access is non-idempotent, i.e., there is a potential side effect from accessing the memory region, then speculative access is not permitted.

In implementations, the fault exception handling and the memory attribute checking can be performed in parallel or sequentially. For example, fault exception handling can be performed followed by memory attribute checking.

These and other aspects of the present disclosure are disclosed in the following detailed description, the appended claims, and the accompanying figures.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

The term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

It is to be understood that the figures and descriptions of embodiments have been simplified to illustrate elements that are relevant for a clear understanding, while eliminating, for the purpose of clarity, many other elements found in typical processors. Those of ordinary skill in the art may recognize that other elements and/or steps are desirable and/or required in implementing the present disclosure. However, because such elements and steps do not facilitate a better understanding of the present disclosure, a discussion of such elements and steps is not provided herein.

FIG. 1 is a block diagram of an example of an integrated circuit 1100 for efficient processing of masked vector memory accesses including efficient handling of exception processing on masked vector memory accesses and checking memory attributes of memory region(s) to be accessed. The integrated circuit 1100 includes at least one processor core 1200 which can include a scalar processing unit 1210, a vector processing unit 1220, register file(s) 1230, a LI instruction cache 1240, a L1 data cache 1250, a L2 cache 1260, and a memory protection circuit 1270. The at least one processor core 1200 can be connected to or be in communication with (collectively "connected to") to a memory 1500 via the LI instruction cache 1240, the L1 data cache 1250, the L2 cache 1260, an interconnection unit 1300 and a memory controller 1400, as appropriate and applicable. In implementations, the memory protection circuit 1270 can be external to the processor core 1200 and internal to the integrated circuit 1100. In implementations, the memory 1500 can be external to the integrated circuit 1100. The integrated circuit 1100 and each element or component in the integrated circuit 1100 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

The integrated circuit 1100 and/or the processor core 1200 can be configured to decode and execute instructions of an instruction set architecture (ISA) (e.g., a RISC-V instruction set). The instructions can execute speculatively and out-of-order in the integrated circuit 1100 and/or the processor core 1200. The integrated circuit 1100 and/or the processor core 1200 can implement a pipelined architecture which can include pipeline stages such as fetch, decode, rename, dispatch, issue, execute, memory access, and write-back stages.

The processor core 1200 and/or the scalar processing unit 1210 can be configured to fetch instructions from and access data stored in the LI instruction cache 1240, the L1 data cache 1250, the L2 cache 1260, and/or the memory 1500, as appropriate and applicable. The processor core 1200 and/or the scalar processing unit 1210 can be configured to fetch instructions from the LI instruction cache 1240, the L2 cache 1260, and/or the memory 1500, as appropriate and applicable. The processor core 1200, the scalar processing unit 1210, and/or the vector processing unit 1220 can be configured to access data in the L1 data cache 1250, the L2 cache 1260, and/or the memory 1500, as appropriate and applicable, in response to instructions. For example, the vector processing unit 1220 can be configured to access data in the L1 data cache 1250, the L2 cache 1260, and/or the memory 1500 into vector instructions including, but not limited to, vector memory instructions such as vector load instructions, vector store instructions, masked vector load instructions, or masked vector store instructions.

The memory protection circuit 1270 can be used to monitor transactions, including instruction fetches and data accesses by the processor core 1200, the scalar processing unit 1210, and/or the vector processing unit 1220, and can raise a fault exception when a memory protection violation is detected with respect to a transaction. For example, an attempt to access unauthorized memory may result in a hardware fault (e.g., a segmentation fault, storage violation exception, or abnormal termination of the offending process). The memory protection circuit 1270 may serve to prevent a process from accessing memory that has not been allocated to it, which may prevent a bug or malware within a process from affecting other processes, or the operating system.

The memory protection circuit 1270 can be configured to perform memory protection checks for one or more addresses with a protection granule or check for memory protection violations with the protection granule. The memory protection circuit 1270 may allow privileged software to define memory regions and assign memory access permission to each of them. The protection granule of the memory protection circuit 1270 limits the size and thus resolution of these memory regions with associated access permissions. For example, the protection granule may correspond to pages of memory (e.g., 4 kB or 8 kB pages). In some implementations, the memory protection circuit 1270 also specifies memory attributes for these memory regions, which may specify the ordering and merging behaviors of these regions, caching and buffering attributes, and idempotency attributes. The memory protection circuit 1270 can check the idempotency memory attributes to determine if a memory region(s) or memory footprint associated with an instruction permits speculative access.

The memory protection circuit 1270 may be of various sizes and complexities. In some implementations, the memory protection circuit 1270 is configured to check two addresses per clock cycle. For example, the memory protection circuit 1270 may have two address ports that allow it to receive two addresses and independently check both of the two addresses in memory for a memory protection violation during a single clock cycle. For example, an address may be checked by comparing a memory protection key or ring for a memory region that includes the address to a memory protection key or ring number associated with a process that is being executed by the processor core 1200 and is attempting to access the memory at the address. In some implementations, the memory protection circuit 1270 is configured to check a single address per clock cycle, and thus may occupy less circuit area and consume less power. In some implementations, the memory protection circuit 1270 may have two or more address ports or otherwise be configured to check two or more addresses or ranges of addresses per clock cycle for memory protection violations.

The memory protection circuit 1270 can be configured to perform a two level or two stage memory protection check for masked vector memory instructions. That is, the memory protection circuit 1270 can perform a conservative level memory protection violation check without consideration of mask information and if needed, perform an exact level memory protection violation check for masked vector memory instructions with consideration of mask information. In implementations, the conservative level memory protection violation check can be based on a memory footprint and without consideration of mask information. In implementations, the exact level memory protection violation check can be an element-by-element check with consideration of the mask information.

At a first level, the memory protection circuit 1270 can be configured to monitor masked vector memory instructions with respect to or at the scalar processing unit 1210. The memory protection circuit 1270 can raise a fault exception when a memory protection violation is detected without consideration of mask information associated with a vector identified by a masked vector memory instruction. In implementations, the memory protection circuit 1270 can decide by checking, without consideration of the mask information, if a memory footprint of the memory addresses or range of addresses associated with a vector is a memory protection violation. For example, the memory footprint can be based on the protection granule, a defined subset of the memory addresses or the range of memory addresses, starting and ending memory addresses, a defined memory region, and/or using other techniques for defining a memory footprint which ignores the mask information and is not done at an element-by-element level for the totality of the memory addresses or a range of memory addresses associated with the vector. In the event that the memory protection circuit 1270 does not raise a fault exception based on the memory footprint, the mask information can be ignored and execution of the masked vector memory instruction can continue if speculative access is permitted with respect to the memory footprint (which can be performed in parallel or sequentially following exception processing). In the event that the memory protection circuit 1270 detects a memory protection violation based on the memory footprint or determines speculative access is not permitted, during processing at the scalar processing unit 1210, the memory protection circuit 1270 can then perform an exact level memory protection violation check with consideration of the mask information.

The memory protection circuit 1270 can be configured to wait until a mask register is loaded with the mask information by the vector processing unit 1220. For example, the mask register can be one of the register file(s) 1230. Consequently, the second or exact level memory protection violation check can be performed with respect to or at the vector processing unit 1220. The memory protection circuit 1270 can be configured to determine element-by-element whether a memory protection violation exists using the mask information associated with the element under consideration. For example, if a masked bit is enabled or set for a vector element, and a memory protection violation is detected for that vector element, then the memory protection circuit 1270 can raise a fault exception for the masked vector memory instruction. For example, if a masked bit is enabled or set for a vector element, and no memory protection violation is detected for that vector element, the corresponding memory access is performed, and execution of the masked vector memory instruction can continue. For example, if a masked bit is disabled or not set for a vector element, the memory access is not performed that vector element, and execution of the masked vector memory instruction can continue. In the event a fault exception is raised by the memory protection circuit 1270, an operating system running on the integrated circuit 1100 and/or the processor core 1200 can halt execution in the processor core 1200, can cause a page to be brought in from a disk to the memory 1500 and/or eventually to the L1 data cache 1250 and/or the L2 cache 1260, and/or perform other fault exception processing.

The memory protection circuit 1270 can be configured to perform a memory attribute check for masked vector memory instructions. The memory protection circuit 1270 can be configured to monitor masked vector memory instructions with respect to or at the scalar processing unit 1210. The memory protection circuit 1270 can check, without consideration of the mask information, if memory attributes associated with a memory footprint of the memory addresses or range of addresses associated with a vector permits speculative access or is idempotent. If speculative access is permitted for the memory footprint, i.e., cacheable memory is being accessed, then execution of the masked vector memory instruction can continue. If access is non-idempotent, i.e., there is a potential side effect from accessing the memory region and speculative access is not permitted, then the exact level memory protection violation check with consideration of the mask information is performed.

The integrated circuit 1100 may provide advantages over conventional processor architectures, such as, for example, enabling efficient fault exception handling for masked vector memory operations, using a simple memory protection circuit that has small circuit area and power consumption. In implementations, the integrated circuit 1100 can implement the process 3000 of FIG. 3, the process 4000 of FIG. 4, and/or combinations thereof.

Figure 2:
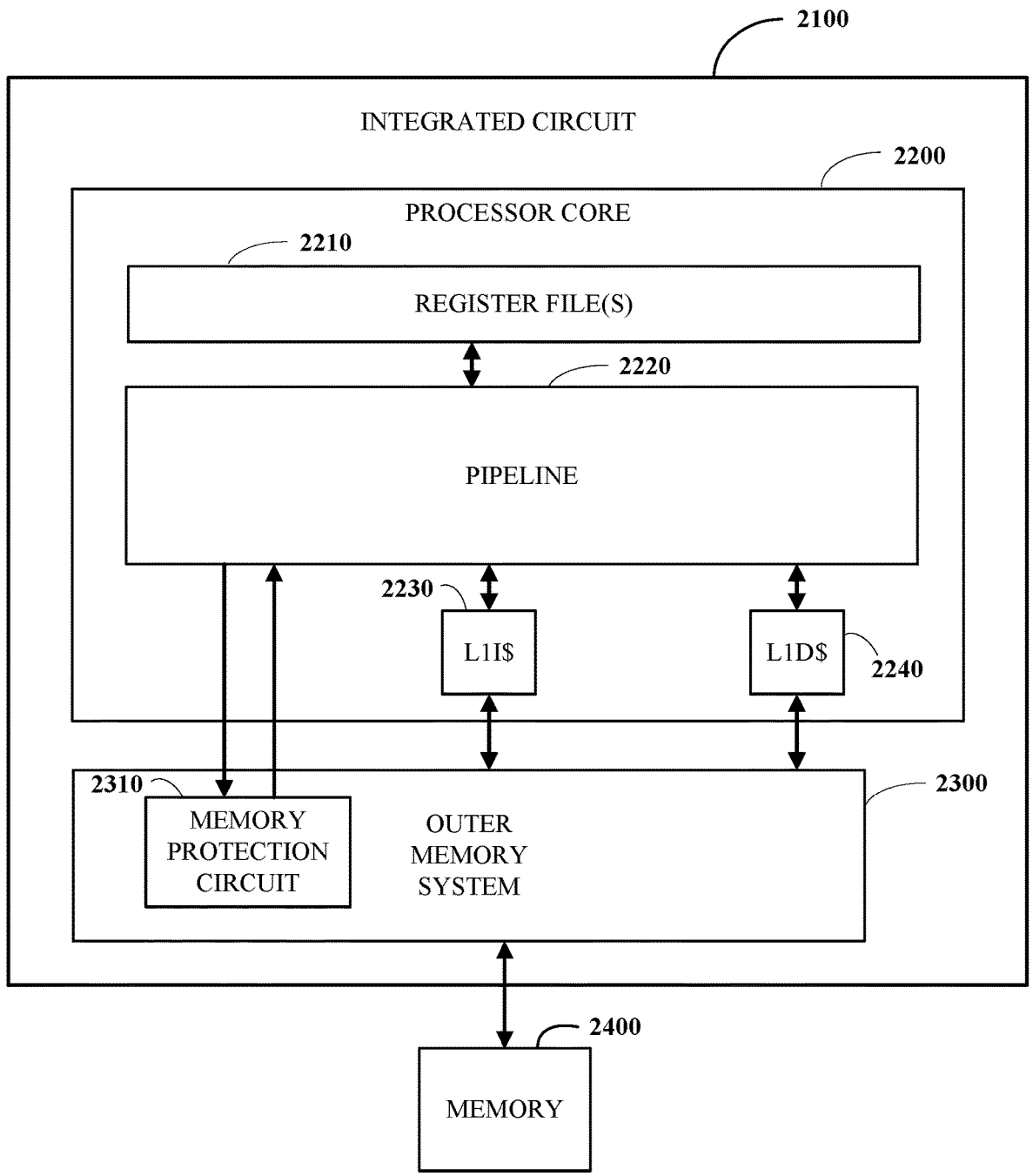
FIG. 2 is a block diagram of an example of an integrated circuit for executing instructions for efficient processing of masked vector memory accesses in accordance with embodiments of this disclosure.

FIG. 2 is a block diagram of an example of an integrated circuit 2100 for processing of masked vector memory accesses including efficient handling of exception processing on masked vector memory accesses and checking memory attributes of memory region(s) to be accessed in accordance with embodiments of this disclosure.

The integrated circuit 2100 includes a processor core 2200. The processor core 2200 includes a processor pipeline 2200 that includes efficient fault exception handling for masked vector memory instructions. The processor core 2200 includes one or more register files 2210 which can include scalar registers, vector registers, control and status registers (CSRs), and/or vector mask registers which can store mask information for a vector identified in a masked vector memory instruction. The processor core 2200 includes an L1 instruction cache 2230 and an L1 data cache 2240. The integrated circuit 2100 includes an outer memory system 2300, which may include memory storing instructions and data and/or provide access to a memory 2400 external to the integrated circuit 2100 that stores instructions and/or data. The outer memory system 2300 includes a memory protection circuit 2310, which may be configured to perform efficient fault exception handling for masked vector memory instructions using a two-level memory protection violation detection scheme and checking memory attributes of memory region(s) to be accessed. The integrated circuit 2100 may provide advantages over conventional processor architectures, such as, for example, enabling efficient fault exception handling for masked vector memory instructions, using a simple memory protection circuit that has small circuit area and power consumption. For example, the integrated circuit 2100 may implement the process 3000 of FIG. 3, the process 4000 of FIG. 4, or combinations thereof.

The pipeline 2220 can be configured to execute instructions, including masked vector memory instructions. The pipeline 2220 includes one or more fetch stages that are configured to retrieve instructions from a memory system of the integrated circuit 2100. For example, the pipeline 2220 can fetch instructions via the L1 instruction cache 2230 and can access data from the L1 data cache 2240. The pipeline 2220 can include additional stages, such as decode, rename, dispatch, issue, execute, memory access, and write-back stages. For example, the pipeline 2220 can be configured to execute instructions of a RISC V instruction set.

The L1 instruction cache 2230 can be a set-associative cache for instruction memory. To avoid the long latency of reading a tag array and a data array in series, and the high power of reading the arrays in parallel, a way predictor may be used. The way predictor may be accessed in an early fetch stage and the hit way may be encoded into the read index of the data array. The tag array may be accessed in a later fetch stage and may be used for verifying the way predictor.

The L1 data cache 2240 can be a set-associative VIPT cache, meaning that it is indexed purely with virtual address bits VA[set] and tagged fully with all translate physical address bits PA[msb:12]. For low power consumption, the tag and data arrays may be looked up in serial so that at most a single data SRAM way is accessed. For example, the line size of the L1 data cache 252 may be 64 Bytes, and the beat size may be 26 Bytes.

The outer memory system 2300 can include memory storing instructions and data and/or provide access to the memory 2400 that stores instructions and/or data. For example, the outer memory system 2300 can include an L2 cache, which may be configured to implement a cache coherency protocol/policy to maintain cache coherency across multiple L1 caches. Although not shown in FIG. 2, the integrated circuit 2100 can include multiple processor cores in some implementations. For example, the outer memory system 2300 can include multiple layers.

The memory protection circuit 2310 can be configured to monitor transactions, including instruction fetches and data accesses by the processor core 2200, and can raise a fault exception when a memory protection violation is detected with respect to a transaction. For example, an attempt to access unauthorized memory may result in a hardware fault (e.g., a segmentation fault, storage violation exception, or abnormal termination of the offending process). The memory protection circuit 2310 may serve to prevent a process from accessing memory that has not been allocated to it, which may prevent a bug or malware within a process from affecting other processes, or the operating system.

The memory protection circuit 2310 can be configured to perform memory protection violation checks for one or more addresses with a protection granule or check for memory protection violations with the protection granule. The memory protection circuit 2310 may allow privileged software to define memory regions and assign memory access permission to each of them. The protection granule of the memory protection circuit 2310 limits the size and thus resolution of these memory regions with associated access permissions. For example, the protection granule may correspond to pages of memory (e.g., 4 kB or 8 kB pages). In some implementations, the memory protection circuit 2310 also specifies memory attributes for these memory regions, which may specify the ordering and merging behaviors of these regions, caching and buffering attributes, and idempotency attributes. The memory protection circuit 2310 can check the idempotency attributes to determine if a memory region(s) or memory footprint associated with an instruction permits speculative access.

The memory protection circuit 2310 may be of various sizes and complexities. In some implementations, the memory protection circuit 2310 is configured to check two addresses per clock cycle. For example, the memory protection circuit 2310 may have two address ports that allow it to receive two addresses and independently check both of the two addresses in memory for a memory protection violation during a single clock cycle. For example, an address may be checked by comparing a memory protection key or ring for a memory region that includes the address to a memory protection key or ring number associated with a process that is being executed by the processor core 2200 and is attempting to access the memory at the address. In some implementations, the memory protection circuit 2310 is configured to check a single address per clock cycle, and thus may occupy less circuit area and consume less power. In some implementations, the memory protection circuit 2310 may have two or more address ports or otherwise be configured to check two or more addresses or ranges of addresses per clock cycle for memory protection violations.

The memory protection circuit 2310 can be configured to perform a two level or two stage memory protection violation check for masked vector memory instructions. That is, the memory protection circuit 2310 can perform a conservative level memory protection violation check without consideration of mask information and if needed, perform an exact level memory protection violation check for masked vector memory instructions with consideration of mask information. In implementations, the conservative level memory protection violation check can be based on a memory footprint and without consideration of mask information. In implementations, the exact level memory protection violation check can be an element-by-element check with consideration of the mask information.

At a first level, the memory protection circuit 2310 can be configured to monitor masked vector memory instructions at an execution stage in the pipeline 2220 and in particular, monitor processing being performed with respect to a scalar unit in the processor core 2200. The memory protection circuit 2310 can raise a fault exception when a memory protection violation is detected without consideration of mask information associated with a vector identified by a masked vector memory instruction. In implementations, the memory protection circuit 2310 can decide by checking, without consideration of the mask information, if a memory footprint of the memory addresses or range of addresses associated with a vector can cause a fault exception. For example, the memory footprint can be based on the protection granule, a defined subset of the memory addresses or the range of memory addresses, starting and ending memory addresses, a defined memory region, and/or using other techniques for defining a memory footprint which ignores the mask information and is not done at an element-by-element level for the totality of the memory addresses or a range of memory addresses associated with the vector. In the event that the memory protection circuit 2310 does not raise a fault exception based on the memory footprint, the mask information can be ignored and execution of the masked vector memory instruction can continue if speculative access is permitted for the memory footprint (which can be performed in parallel or sequentially following exception processing). In the event that the memory protection circuit 2310 detects a memory protection violation or determines speculative access is not permitted during processing at the scalar unit based on the memory footprint, the memory protection circuit 2310 can then perform an exact level memory protection check with consideration of the mask information.

The memory protection circuit 2310 can be configured to wait until a mask register is loaded with the mask information during processing by a vector unit in the processor core 2200. The memory protection circuit 2310 can be configured to determine element-by-element whether a memory protection violation exists using the mask information associated with the element under consideration. For example, if a masked bit is enabled or set for a vector element, and a memory protection violation is detected for that vector element, then the memory protection circuit 2310 can raise a fault exception for the masked vector memory instruction. For example, if a masked bit is enabled or set for a vector element, and no memory protection violation is detected for that vector element, the corresponding memory access is performed, and execution of the masked vector memory instruction can continue. For example, if a masked bit is disabled or not set for a vector element, the memory access is not performed that vector element, and execution of the masked vector memory instruction can continue.

In the event a fault exception is raised by the memory protection circuit 2310, an operating system running on the integrated circuit 2100 and/or the processor core 2200 can halt execution in the pipeline 2220 and/or in the processor core 2200, can cause a page to be brought in from a disk to the memory 2400, the outer memory 2300, and/or eventually to the L1 data cache 2240, and/or perform other fault exception processing.

The memory protection circuit 2310 can be configured to perform memory attribute checks at an execution stage in the pipeline 2220 and in particular, perform memory attribute checks with respect to a scalar unit in the processor core 2200. The memory protection circuit 2310 can perform a memory attribute check without consideration of mask information associated with a vector identified by a masked vector memory instruction. In implementations, the memory protection circuit 2310 can check, without consideration of mask information, memory attributes for a memory footprint associated with the vector. The memory protection circuit 1270 can check, without consideration of the mask information, if memory attributes for a memory footprint associated with a vector permits speculative access or is idempotent. If speculative access is permitted for the memory footprint, i.e., cacheable memory is being accessed, then execution of the masked vector memory instruction can continue. If access is non-idempotent, i.e., there is a potential side effect from accessing the memory region and speculative access is not permitted, then the exact level memory protection violation check with consideration of the mask information is performed.

The integrated circuit 2100 can provide advantages over conventional processor architectures, such as, for example, enabling efficient fault exception handling for masked vector memory operations, using a simple memory protection circuit that has small circuit area and power consumption. In implementations, the integrated circuit 2100 can implement the process 3000 of FIG. 3, the process 4000 of FIG. 4, and/or combinations thereof.

Figure 3:
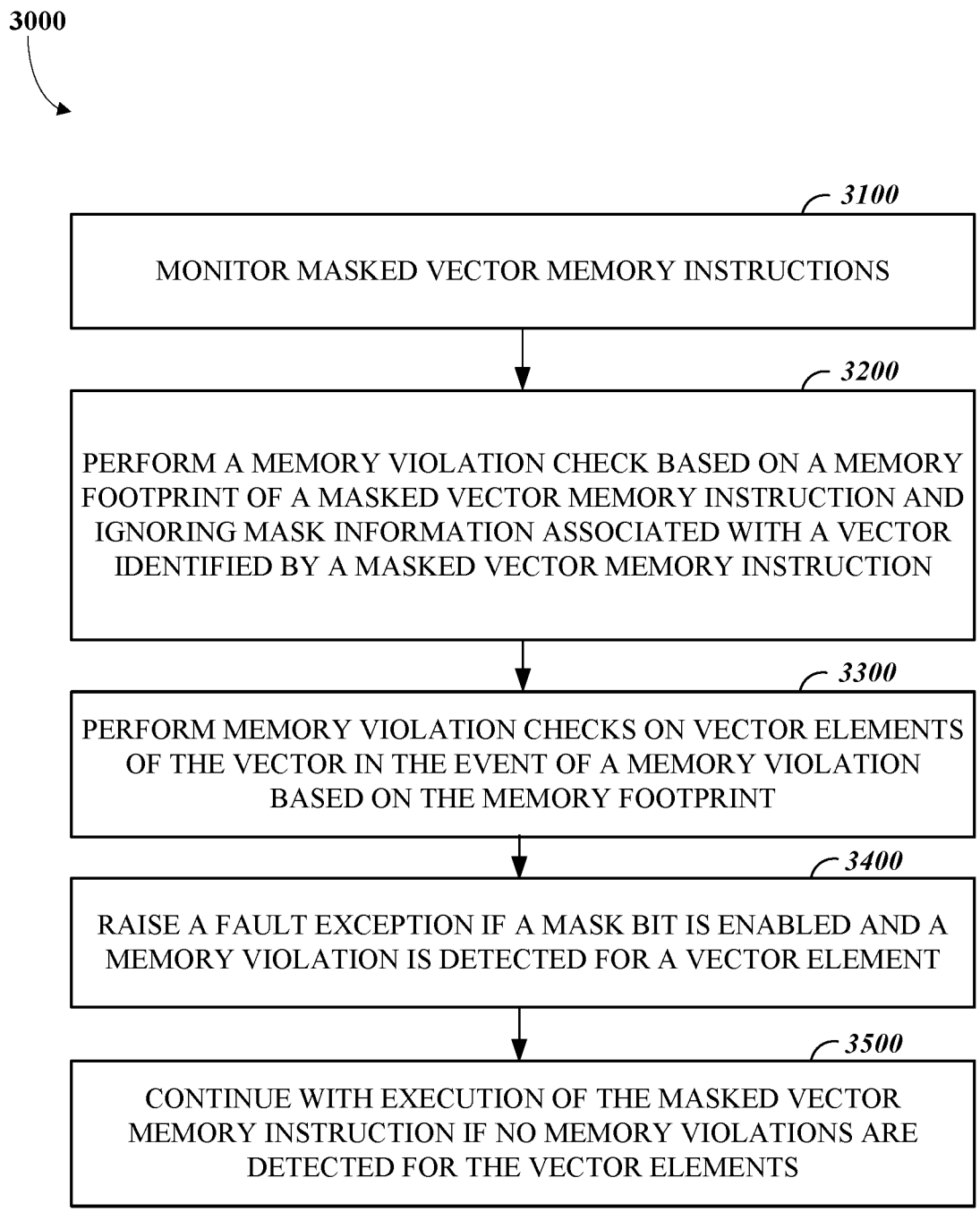
FIG. 3 is a flow chart of an example of a process for efficient processing of masked vector memory accesses in accordance with embodiments of this disclosure.

FIG. 3 is a diagram of an example technique 3000 for efficient handling of exception processing on masked vector memory accesses in accordance with embodiments of this disclosure. The technique 3000 includes: monitoring 3100 masked vector memory instructions; performing 3200 a memory protection violation check based on a memory footprint of a masked vector memory instruction and ignoring mask information associated with a vector identified by a masked vector memory instruction; performing 3300 memory protection violation checks on vector elements of the vector in the event of a memory protection violation based on the memory footprint; raising 3400 a fault exception if a mask bit is enabled for a vector element; and continuing 3500 with execution of the masked vector memory instruction if no memory protection violations are detected for the vector elements. The technique 3000 may be implemented using the integrated circuit 1100 of FIG. 1, the processor core 1200 of FIG. 1, the scalar processing unit 1210 of FIG. 1, the vector processing unit 1220 of FIG. 1, the register file(s) 1230 of FIG. 1, the memory protection circuit 1270 of FIG. 1, the integrated circuit 2100 of FIG. 2, the processor core 2200 of FIG. 2, the pipeline 2220 of FIG. 2, the register file(s) 2210 of FIG. 2, and/or the memory protection circuit 2310 of FIG. 2, as applicable and appropriate.

The technique 3000 includes monitoring 3100 masked vector memory instructions. A memory protection circuit can monitor vector memory instructions including masked vector memory instructions. The memory protection circuit can monitor the vector memory instructions in the processor core during scalar unit processing or operations and during vector unit processing or operations.

The technique 3000 includes performing 3200 a memory protection violation check based on a memory footprint of a masked vector memory instruction and ignoring mask information associated with a vector identified by a masked vector memory instruction. The vector can have N vector elements. The memory protection circuit can perform memory check violations during scalar processing which does not take into consideration mask information. The memory protection circuit uses a memory footprint associated with the range of memory addresses related to the masked vector memory instruction. The memory footprint can be determined using a variety of techniques as described herein and as described in U.S. Provisional Application Patent Ser. No. 63/073,916, filed on Sep. 2, 2020, entitled "MEMORY PROTECTION FOR VECTOR OPERATIONS", which is incorporated herein by reference in its entirety.

The technique 3000 includes performing 3300 memory protection violation checks on vector elements of the vector in the event of a memory protection violation based on the memory footprint. Instead of raising a fault exception after detection of a memory protection violation based on the memory footprint, the memory protection circuit waits for the vector processing unit to complete loading of the masked information into the mask or vector registers. In implementations, the loading of the mask registers is not dependent on the memory protection violation processing. In implementations, other operations have already initiated loading of the mask registers. After the mask registers are loaded with the mask information for the vector, the memory protection circuit determines, for the vector elements in the vector, whether a mask bit is enabled or not. An enabled mask bit indicates that the memory address(es) associated with the vector element is relevant, e.g., the memory address(es) is to be used or processed. A non-enabled bit indicates that the memory address is not relevant.

The technique 3000 includes raising 3400 a fault exception if a mask bit is enabled and a memory violation is detected for a vector element. The memory protection circuit raises a fault exception if the mask bit is enabled and a memory violation is detected for a vector element. An operating system performs fault exception processing with respect to the masked vector memory instruction which includes a variety of processes such as halting execution of the masked vector memory instruction, servicing a page fault from disk, and the like.

Figure 4:
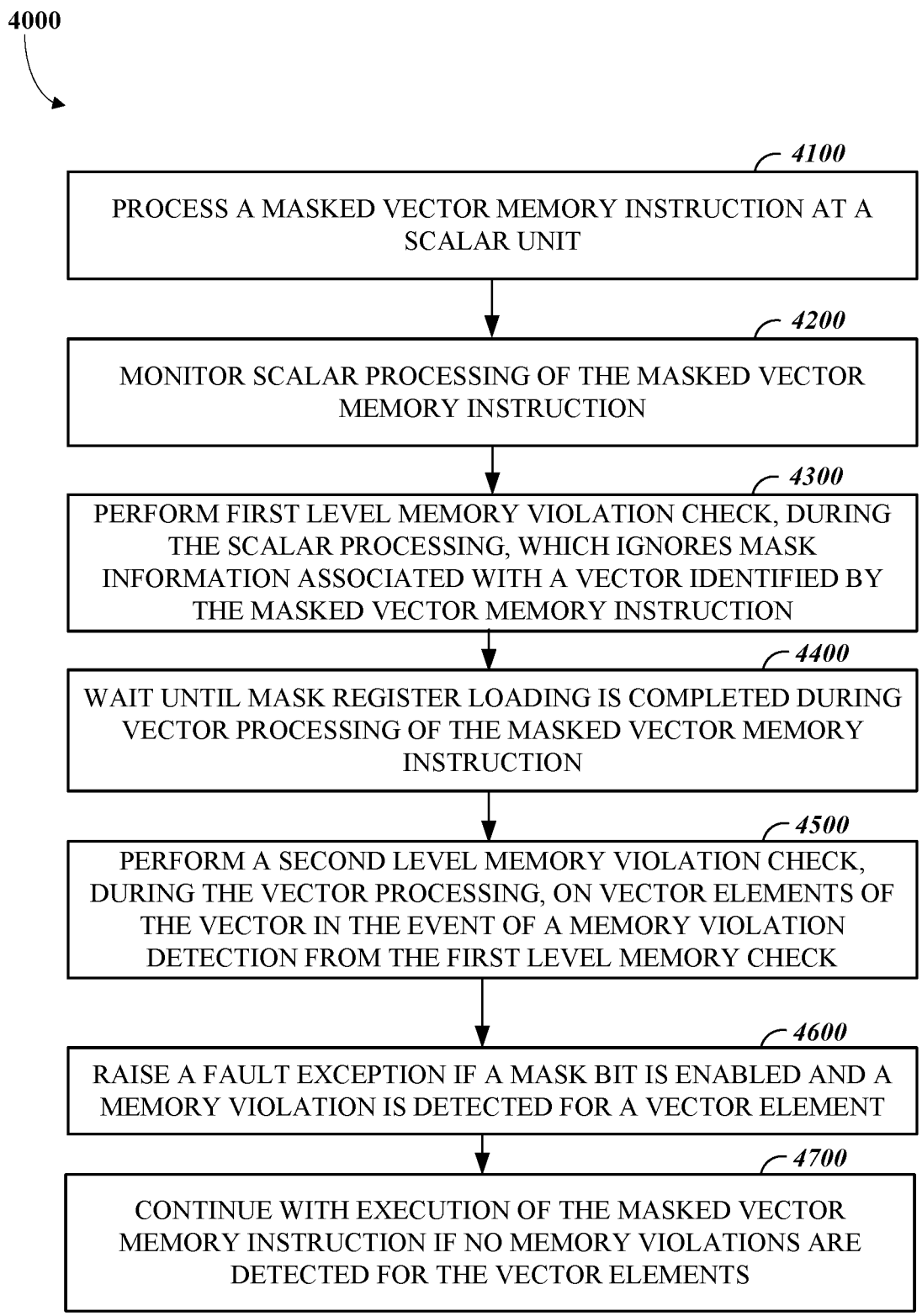
FIG. 4 is a flow chart of an example of a process for efficient processing of masked vector memory accesses in accordance with embodiments of this disclosure.

The technique 3000 includes continuing 3500 with execution of the masked vector memory instruction if no memory protection violations are detected for the vector elements. If a mask bit for a vector element is set and no memory protection violation is detected for that vector element, the corresponding memory access is performed, and execution can continue. The memory protection circuit ignores any memory protection violations associated with vector elements which have a mask bit unenabled or not set. Memory attribute checking can be performed in parallel or sequentially after fault exception processing. Memory attribute checking can be done without consideration of the mask information (e.g., based on a memory footprint). If speculative access is denied, then memory protection violation checks are performed on vector elements of the vector. If speculative access is permitted for the memory footprint or memory region(s), i.e., it is cacheable memory, then execution of the masked vector memory instruction can continue. Optimized execution occurs when both memory violation check and memory attribute check are performed and pass without considering the mask information. If access is non-idempotent without consideration of the mask information, i.e., there is a potential side effect from accessing the memory region, then speculative access is not permitted, FIG. 4 is a diagram of an example technique 4000 for efficient handling of exception processing on masked vector memory accesses in accordance with embodiments of this disclosure. The technique 4000 includes: processing 4100 a masked vector memory instruction at a scalar unit; monitoring 4200 scalar processing of the masked vector memory instruction; performing 4300 a first level memory protection violation check, during the scalar processing, which ignores mask information associated with a vector identified by the masked vector memory instruction; waiting 4400 until mask register loading is completed during vector processing of the masked vector memory instruction; performing 4500 a second level memory protection violation check, during the vector processing, on vector elements of the vector in the event of a memory protection violation detection from the first level memory check; raising 4600 a fault exception if a mask bit is enabled for a vector element; and continuing 4700 with execution of the masked vector memory instruction if no memory protection violations are detected for the vector elements. The technique 4000 may be implemented using the integrated circuit 1100 of FIG. 1, the processor core 1200 of FIG. 1, the scalar processing unit 1210 of FIG. 1, the vector processing unit 1220 of FIG. 1, the register file(s) 1230 of FIG. 1, the memory protection circuit 1270 of FIG. 1, the integrated circuit 2100 of FIG. 2, the processor core 2200 of FIG. 2, the pipeline 2220 of FIG. 2, the register file(s) 2210 of FIG. 2, and/or the memory protection circuit 2310 of FIG. 2, as applicable and appropriate.

The technique 4000 includes processing 4100 a masked vector memory instruction at a scalar unit. A scalar processing unit in a processing system fetches instructions from a memory system and decodes the fetched instructions for execution.

The technique 4000 includes monitoring 4200 scalar processing of the masked vector memory instruction. A memory protection circuit can monitor vector memory instructions including masked vector memory instructions. The memory protection circuit can monitor the vector memory instructions in the processor core during scalar unit processing or operations and during vector unit processing or operations.

The technique 4000 includes performing 4300 a first level memory protection violation check, during the scalar processing, which ignores mask information associated with a vector identified by the masked vector memory instruction. The vector can have N vector elements. The memory protection circuit can perform memory check violations during scalar processing which does not take into consideration mask information. The memory protection circuit uses a memory footprint associated with the range of memory addresses related to the masked vector memory instruction. The memory footprint can be determined using a variety of techniques as described herein and as described in U.S. Provisional Application Patent Ser. No. 63/073,916, filed on Sep. 2, 2020, entitled "MEMORY PROTECTION FOR VECTOR OPERATIONS", which is incorporated herein by reference in its entirety.

The technique 4000 includes waiting 4400 until mask register loading is completed during vector processing of the masked vector memory instruction. Instead of raising a fault exception after detection of a memory protection violation based on the memory footprint, the memory protection circuit waits for the vector processing unit to complete loading of the masked information into the mask or vector registers. In implementations, the loading of the mask registers is not dependent on the memory protection violation processing. In implementations, other operations have already initiated loading of the mask registers.

The technique 4000 includes performing 4500 a second level memory protection violation check, during the vector processing, on vector elements of the vector in the event of a memory protection violation detection from the first level memory check. After the mask registers are loaded with the mask information for the vector, the memory protection circuit determines, for the vector elements in the vector, whether a mask hit is enabled or not. An enabled mask bit indicates that the memory address(es) associated with the vector element is relevant, e.g., the memory address(es) is to be used or processed. A non-enabled bit indicates that the memory address is not relevant.

The technique 4000 includes raising 4600 a fault exception if a mask bit is enabled and a memory violation is detected for a vector element. The memory protection circuit raises a fault exception if the mask bit enabled and a memory violation is detected for a vector element. An operating system performs fault exception processing with respect to the masked vector memory instruction which includes a variety of processes such as halting execution of the masked vector memory instruction, servicing a page fault from disk, and the like.

Figure 5:
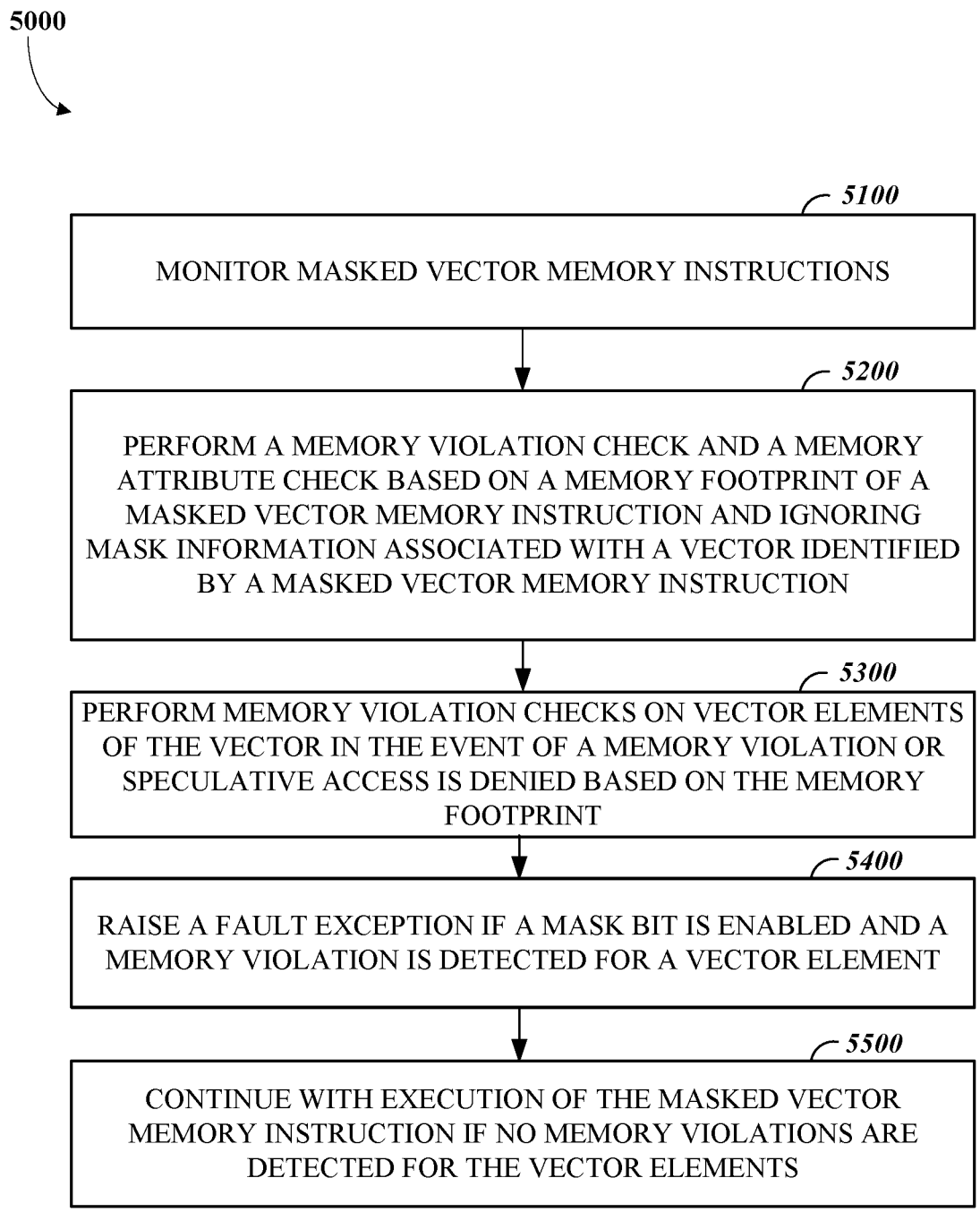
FIG. 5 is a flow chart of an example of a process for efficient processing of masked vector memory accesses in accordance with embodiments of this disclosure.

The technique 4000 includes continuing 4700 with execution of the masked vector memory instruction if no memory protection violations are detected for the vector elements. If a mask bit for a vector element is set and no memory protection violation is detected for that vector element, the corresponding memory access is performed, and execution can continue. The memory protection circuit ignores any memory protection violations associated with vector elements which have a mask bit unenabled or not set. Memory attribute checking can be performed in parallel or sequentially after fault exception processing. Memory attribute checking can be done without consideration of the mask information (e.g., based on a memory footprint). If speculative access is denied, then memory protection violation checks are performed on vector elements of the vector. If speculative access is permitted for the memory footprint or memory region(s), i.e., it is cacheable memory, then execution of the masked vector memory instruction can continue. Optimized execution occurs when both memory violation check and memory attribute check are performed and pass without considering the mask information. If access is non-idempotent without consideration of the mask information, i.e., there is a potential side effect from accessing the memory region, then speculative access is not permitted, FIG. 5 is a diagram of an example technique 5000 for efficient handling of exception processing on masked vector memory accesses in accordance with embodiments of this disclosure. The technique 5000 includes: monitoring 5100 masked vector memory instructions; performing 5200 a memory protection violation check and a memory attribution check based on a memory footprint of a masked vector memory instruction and ignoring mask information associated with a vector identified by a masked vector memory instruction; performing 5300 memory protection violation checks on vector elements of the vector in the event of a memory protection violation or speculative access is denied based on the memory footprint; raising 5400 a fault exception if a mask bit is enabled and a memory violation is detected for a vector element; and continuing 5500 with execution of the masked vector memory instruction if no memory protection violations are detected for the vector elements. The technique 5000 may be implemented using the integrated circuit 1100 of FIG. 1, the processor core 1200 of FIG. 1, the scalar processing unit 1210 of FIG. 1, the vector processing unit 1220 of FIG. 1, the register file(s) 1230 of FIG. 1, the memory protection circuit 1270 of FIG. 1, the integrated circuit 2100 of FIG. 2, the processor core 2200 of FIG. 2, the pipeline 2220 of FIG. 2, the register file(s) 2210 of FIG. 2, and/or the memory protection circuit 2310 of FIG. 2, as applicable and appropriate.

The technique 5000 includes monitoring 5100 masked vector memory instructions. A memory protection circuit can monitor vector memory instructions including masked vector memory instructions. The memory protection circuit can monitor the vector memory instructions in the processor core during scalar unit processing or operations and during vector unit processing or operations.

The technique 5000 includes performing 5200 a memory protection violation check and a memory attribution check based on a memory footprint of a masked vector memory instruction and ignoring mask information associated with a vector identified by a masked vector memory instruction. The vector can have N vector elements. The memory protection circuit can perform memory check violations during scalar processing which does not take into consideration mask information. The memory protection circuit uses a memory footprint associated with the range of memory addresses related to the masked vector memory instruction. The memory footprint can be determined using a variety of techniques as described herein and as described in U.S. Provisional Application Patent Ser. No. 63/073,916, filed on Sep. 2, 2020, entitled "MEMORY PROTECTION FOR VECTOR OPERATIONS", which is incorporated herein by reference in its entirety. Memory attribute checking can be performed in parallel or sequentially after fault exception processing. Memory attribute checking can be done without consideration of the mask information (e.g., based on a memory footprint). If speculative access is permitted for the memory footprint or memory region(s), i.e., it is cacheable memory, then execution of the masked vector memory instruction can continue. Optimized execution occurs when both memory violation check and memory attribute check are performed and pass without considering the mask information.

The technique 5000 includes performing 5300 memory protection violation checks on vector elements of the vector in the event of a memory protection violation or speculative access is denied based on the memory footprint. If memory access is non-idempotent without consideration of the mask information, i.e., there is a potential side effect from accessing the memory region, then speculative access is not permitted. Instead of raising a fault exception after detection of a memory protection violation based on the memory footprint or if speculative access is denied, the memory protection circuit waits for the vector processing unit to complete loading of the masked information into the mask or vector registers. In implementations, the loading of the mask registers is not dependent on the memory protection violation processing. In implementations, other operations have already initiated loading of the mask registers. After the mask registers are loaded with the mask information for the vector, the memory protection circuit determines, for the vector elements in the vector, whether a mask bit is enabled or not. An enabled mask bit indicates that the memory address(es) associated with the vector element is relevant, e.g., the memory address(es) is to be used or processed. A non-enabled bit indicates that the memory address is not relevant.

The technique 5000 includes raising 5400 a fault exception if a mask bit is enabled and a memory violation is detected for a vector element. The memory protection circuit raises a fault exception if the mask bit is enabled and a memory violation is detected for that vector element. An operating system performs fault exception processing with respect to the masked vector memory instruction which includes a variety of processes such as halting execution of the masked vector memory instruction, servicing a page fault from disk, and the like.

The technique 5000 includes continuing 5500 with execution of the masked vector memory instruction if no memory protection violations are detected for the vector elements. If a mask bit for a vector element is set and no memory protection violation is detected for that vector element, the corresponding memory access is performed, and execution can continue. The memory protection circuit ignores any memory protection violations associated with vector elements which have a mask bit unenabled or not set.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. An integrated circuit for executing instructions comprising:
a processor core including a pipeline configured to execute masked vector memory instructions; and
a memory protection circuit configured to check for memory protection violations, the memory protection circuit configured to:
monitor the masked vector memory instructions;
perform a memory protection violation check, during scalar processing, based on a memory footprint of a masked vector memory instruction while ignoring mask information associated with a vector identified by the masked vector memory instruction;
after performing the memory protection violation check, perform memory protection violation checks, during vector processing, on vector elements of the vector in the event of a memory protection violation or speculative access is denied based on the memory footprint; and
based on the memory protection violation checks, perform one of:
raise a fault exception when a mask bit is enabled and a memory violation is detected for a vector element; or
continue with execution of the masked vector memory instruction when no memory protection violations are detected for the vector elements.

2. The integrated circuit of claim 1, wherein the memory footprint is an indicator of a range of memory addresses associated with the masked vector memory instruction.

3. The integrated circuit of claim 1, wherein the memory protection circuit is further configured to:
wait until a mask register is loaded with mask information by a vector processor of the processor core.

4. The integrated circuit of claim 1, wherein the memory protection circuit is further configured to:
ignore a detected memory protection violation for a vector element when a mask bit is not set.

5. The integrated circuit of claim 1, wherein the memory protection circuit monitors the masked vector memory instructions during the scalar processing and during the vector processing.

6. The integrated circuit of claim 1, wherein the memory protection circuit is further configured to:
continue with execution of the masked vector memory instruction when no memory protection violations are detected and speculative access is permitted with respect to the memory footprint.

7. The integrated circuit of claim 1, wherein a scalar unit of the processor core is configured to fetch and decode the masked vector memory instructions.

8. An integrated circuit for executing instructions comprising:
a processor core including at least a scalar processor and a vector processor; and
a memory protection circuit configured to:
monitor processing of a masked vector memory instruction by the scalar processor;
perform a first level memory protection violation check and an idempotent memory attributes check, during scalar processing, which ignores mask information associated with a vector identified by the masked vector memory instruction;
wait until mask register loading is completed during vector processing of the masked vector memory instruction by the vector processor;
after performing the first level memory protection violation check, perform a second level memory protection violation check, during the vector processing, on vector elements of the vector in the event of a memory protection violation detection from the first level memory check or speculative access is denied based on checking the idempotent memory attributes; and
based on the second level memory protection violation check, perform one of:
raise a fault exception when a mask bit is enabled and a memory violation is detected for a vector element; or
continue with execution of the masked vector memory instruction when no memory protection violations are detected for the vector elements.

9. The integrated circuit of claim 8, wherein the first level memory protection violation check is based on a memory footprint indicative of a range of memory addresses associated with the masked vector memory instruction.

10. The integrated circuit of claim 8, wherein the memory protection circuit is further configured to:
ignore a detected memory protection violation for a vector element when a mask bit is not set.

11. The integrated circuit of claim 8, wherein the memory protection circuit monitors the masked vector memory instructions during the vector processing.

12. The integrated circuit of claim 8, wherein the memory protection circuit is further configured to:
continue with execution of the masked vector memory instruction when no memory protection violations are detected with respect to the first level memory protection violation check elements and speculative access is permitted.

13. The integrated circuit of claim 8, wherein the scalar processor is configured to fetch and decode the masked vector memory instructions.

14. A method comprising:
monitoring masked vector memory instructions;
performing a memory protection violation check, during scalar processing, based on a memory footprint of a masked vector memory instruction while ignoring mask information associated with a vector identified by the masked vector memory instruction;
after performing the memory protection violation check, performing memory protection violation checks, during vector processing, on vector elements of the vector in the event of a memory protection violation or speculative access is denied based on the memory footprint; and
based on the memory protection violation checks, performing one of:
raising a fault exception when a mask bit is enabled and a memory violation is detected for a vector element; or continuing with execution of the masked vector memory instruction if no memory protection violations are detected for the vector elements.

15. The method of claim 14, wherein the memory footprint is an indicator of a range of memory addresses associated with the masked vector memory instruction.

16. The method of claim 14, further comprising:
waiting until a mask register is loaded with mask information by a vector processor.

17. The method of claim 14, further comprising:
ignoring a detected memory protection violation for a vector element when a mask bit is not set.

18. The method of claim 14, wherein the monitoring further includes:
monitoring the masked vector memory instructions during the scalar processing; and
monitoring the masked vector memory instructions during the during the vector processing.

19. The method of claim 14, further comprising:
continuing with execution of the masked vector memory instruction when no memory protection violations are detected with respect to the memory footprint and speculative access is permitted.

20. The method of claim 19, further comprising:
performing a memory attribute check, during scalar processing, based on the memory footprint and ignoring the mask information associated with a vector identified by the masked vector memory instruction.

* * * * *